(12) United States Patent
Masaoka (10) Patent No.: US 11,316,360 B2
(45) Date of Patent: Apr. 26, 2022

(54) ELECTRONIC APPARATUS (71) Applicant: Panasonic Intellectual Property Management Co., Ltd., Osaka (JP)

(72) Inventor: Satoru Masaoka, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 10 days.

(21) Appl. No.: 16/996,175

(22) Filed: Aug. 18, 2020

(65) Prior Publication Data

US 2020/0381922 A1 Dec. 3, 2020

Related U.S. Application Data

(63) Continuation of application No. PCT/JP2019/005097, filed on Feb. 13, 2019.

(30) Foreign Application Priority Data

Feb. 23, 2018 (JP) .............................. JP2018-031180

(51) Int. Cl.
*H02J 7/00* (2006.01)

(52) U.S. Cl.
CPC ............ *H02J 7/007* (2013.01); *H02J 7/0068* (2013.01); *H02J 7/00714* (2020.01); *H02J 2207/20* (2020.01)

(58) Field of Classification Search
CPC ...... H02J 7/007; H02J 7/0068; H02J 7/00714; H02J 2207/20

(Continued)

(56) References Cited

U.S. PATENT DOCUMENTS

| 2011/0095728 A1* | 4/2011 | Chen ......................... H02J 7/00 |
| | | 320/162 |
| 2011/0121653 A1 | 5/2011 | Hartular |

(Continued)

FOREIGN PATENT DOCUMENTS

| JP | 2002-199616 A | 7/2002 |
| JP | 2012-010578 A | 1/2012 |

(Continued)

OTHER PUBLICATIONS

English translation of the International Preliminary Report on Patentability for corresponding Application No. PCT/JP2019/005097, dated Sep. 3, 2020.

(Continued)

*Primary Examiner* — Edward Tso
*Assistant Examiner* — Aaron Piggush
(74) *Attorney, Agent, or Firm* — Renner, Otto, Boisselle & Sklar, LLP (57) ABSTRACT

An electronic apparatus according to an aspect of the present disclosure includes an external electric power input terminal for inputting electric power from an external device, a detector for detecting that the external device is connected to the external electric power input terminal, a battery that is chargeable, a measuring unit for measuring a voltage and a current of the battery, a load circuit for consuming the electric power, a charging circuit for charging the battery, and a power controller for controlling on/off of the charging circuit, wherein the power controller set the charging circuit off during a predetermined period, when a discharge operation of the battery is detected based on a measuring result of the measuring unit in a state in which the charging circuit is set on, when the detector detects that the external device is connected to the external electric power input terminal.

6 Claims, 6 Drawing Sheets

(58) Field of Classification Search
USPC .................. 320/106, 114, 134, 136, 157
See application file for complete search history.

(56) References Cited

U.S. PATENT DOCUMENTS

2012/0212057 A1    8/2012    Okuma
2013/0241496 A1*    9/2013    Kurayama ............ H02J 7/0031
                                                      320/134
2013/0264865 A1   10/2013    Sugeno

FOREIGN PATENT DOCUMENTS

JP        2012-175736 A    9/2012
JP        2013-233070 A    11/2013
JP        2015-025685 A    2/2015

OTHER PUBLICATIONS

International Search Report for corresponding Application No. PCT/JP2019/005097, dated Apr. 16, 2019.

* cited by examiner

ELECTRONIC APPARATUS

CROSS-REFERENCE TO RELATED APPLICATIONS

This is a continuation application of International Application No. PCT/JP2019/005097, with an international filing date of Feb. 13, 2019, which claims priority of Japanese Patent Application No.: 2018-031180 filed on Feb. 23, 2018, the content of which is incorporated herein by reference.

BACKGROUND

1. Technical Field

The present disclosure relates to an electronic apparatus having a function of charging a secondary battery incorporated by electric power supplied from an external device.

2. Related Art

JP-A-2012-10578 discloses a system for controlling a DC/DC converter circuit that controls electric power between an AC/DC adapter, a battery, and an electronic apparatus. The system includes a controller for connecting the DC/DC converter circuit to the battery and the electronic apparatus when electric power supplied current from the electronic apparatus exceeds the maximum rated output current when the AC/DC adapter is connected to the electronic apparatus.

In addition, JP-A-2015-25685 discloses a power management system including a secondary battery. A power management system includes a battery monitor for executing at least one of an irreversible state of (i) an attachment/detachment state of a secondary battery pack, (ii) a low-voltage state of a battery voltage VBAT, and (iii) a useable state/unusable state of a secondary battery pack. A battery measuring unit measures a battery voltage VBAT, a charge/discharge current IBAT, and a temperature T of the secondary battery pack, and converts it into digital data. The charging circuit is configured to charge the secondary battery pack using a DC voltage from an external power source based on the state detected by the battery monitoring unit and the information measured by the battery monitor. A coulomb counter measures a charge/discharge current IBAT at a predetermined time interval, and integrates the charge/discharge current IBAT to calculate the sum of the amount of electric charge of charging or the amount of electric charge of discharging.

SUMMARY

There is a problem that when charging/discharging of a battery is repeated in an electronic apparatus having a function of charging an internal battery with electric power received from an external device, the battery is deteriorated.

The present disclosure provides an electronic apparatus that receives electric power from an external device and supplies it to an internal load circuit and a battery, and can suppress battery deterioration due to repeated charging.

An electronic apparatus according to an aspect of the present disclosure includes an external electric power input terminal for inputting electric power from an external device, a detector for detecting that the external device is connected to the external electric power input terminal, a battery that is chargeable, a measuring unit for measuring a voltage and a current of the battery, a load circuit for consuming the electric power, a charging circuit for charging the battery, and a power controller for controlling on/off of the charging circuit, wherein the power controller set the charging circuit off during a predetermined period, when a discharge operation of the battery is detected based on a measuring result of the measuring unit in a state in which the charging circuit is set on, when the detector detects that the external device is connected to the external electric power input terminal.

According to the electronic apparatus of the present disclosure, even when electric power consumption of an internal load fluctuates near the maximum supply power of an external device, battery deterioration due to repeated charging can be suppressed.

DETAILED DESCRIPTION

Hereinafter, embodiments will be described as appropriate in detail with reference to the drawings. However, more detailed description than necessary may be omitted. For example, detailed descriptions of already well-known matters and repeated descriptions for substantially the same configuration may be omitted. This is to avoid the following description from becoming unnecessarily redundant and to facilitate understanding by those skilled in the art.

In addition, the inventor provides the accompanying drawings and the following description in order for those skilled in the art to fully understand the present disclosure. The drawings and the description are not intended to limit the subject matter described in the claims.

First Embodiment

[1-1. Configuration]

Figure 1:
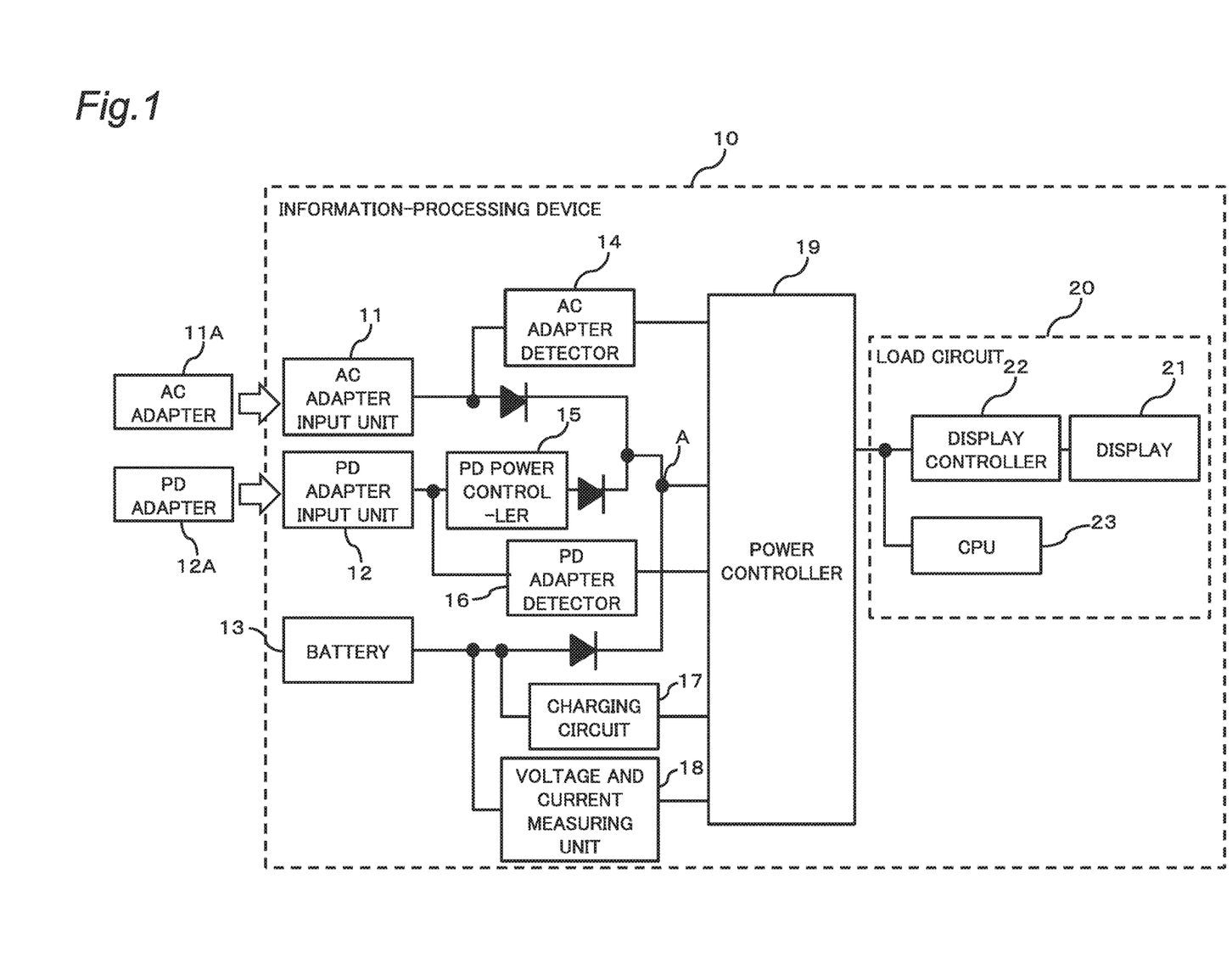
FIG. 1 is a diagram showing a configuration relating to a charging function of a battery in an information-processing device according to the present disclosure.

FIG. 1 is a diagram showing a configuration relating to a charging function of a battery in an information-processing device according to a first embodiment of the present disclosure. An information-processing device 10 can receive supply of electric power from two external power supplies of an AC adapter 11a and a PD adapter 12a. Therefore, the information-processing device 10 includes an AC adapter input unit 11 for connecting the AC adapter 11a, and a PD adapter input unit 12 for connecting the PD adapter 12a.

The AC adapter 11a is a power conversion device for converting an AC voltage from a commercial power source into a predetermined DC voltage. The PD adapter 12a supplies electric power to other device according to a predetermined serial bus standard (in the present embodiment, a USB power delivery standard). The PD adapter 12a converts the AC voltage from the commercial power source to a predetermined DC voltage and outputs it. In the present embodiment, the predetermined serial bus standard is a passive power delivery standard, but other standards may be used as long as capable of supplying electric power.

The AC adapter input unit 11 is electrically connected to the AC adapter 11a and includes an input terminal for inputting electric power from the AC adapter 11a. The PD adapter input unit 12 is electrically connected to the PD adapter 12a and includes an input terminal for inputting electric power from the PD adapter 12a. An input terminal of the PD adapter input unit 12 is configured to satisfy a USB power delivery standard.

The information-processing device 10 further includes an AC adapter detector 14 for detecting a connection of the AC adapter 11A to the AC adapter input unit 11, and a PD adapter detector 16 for detecting a connection of the PD adapter 12a to the PD adapter input unit 12. The AC adapter detector 14 detects the connection of the AC adapter 11a by monitoring an output voltage from the AC adapter input unit 11. The PD adapter detector 16 detects the connection of the PD adapter 12a by monitoring the output voltage from the PD adapter input unit 12.

The information-processing device 10 further includes a PD power controller 15 for controlling electric power to be taken from the PD adapter 12a to the information-processing device 10.

The information-processing device 10 includes the battery 13 that is chargeable, a charging circuit 17 for controlling charging of the battery 13, and a voltage and current measuring unit 18. The battery 13 is a rechargeable secondary battery. For example, the battery 13 is a lithium ion battery or a nickel hydrogen battery.

Further, the information-processing device 10 is provided with a power controller 19 for controlling charging and supplying of electric power of the battery 13. The power controller 19 can be realized by a semiconductor element or the like. The power controller 19 may be configured by hardware alone, or may be realized by combining hardware and software. For example, the power controller 19 can be realized by a processor such as a CPU, MPU, DSP, DSU, GPU, FPGA, ASIC, or the like.

The information-processing device 10 includes a load circuit 20 that consumes power. The load circuit 20 includes, for example, a display 21, a display controller 22 for controlling a display 21, and a CPU 23.

[1-2. Operation]

The operation of the information-processing device 10 configured as described above will be described below.

As shown in FIG. 1, an output of the AC adapter input unit 11, an output of the PD power controller 15 and the battery 13 are commonly connected to a node A via a diode, and are inputted to the power controller 19. That is, the output of the AC adapter 11a, the output of the PD adapter 12a, and the battery 13 are connected in parallel to the load circuit 20. When each power source is connected in this manner, electric power is supplied preferentially from the electric power source having a high supply capability to the load circuit 20.

That is, when a plurality of power sources are connected to the information-processing device 10 at the same time, electric power is preferentially supplied to the load circuit 20 in the order of the AC adapter 11a, the PD adapter 12a, and the battery 13. More specifically, when the electric power supplied from the AC adapter 11a is larger than the electric power consumed by the load circuit 20, only the electric power from the AC adapter 11a is supplied to the load circuit 20. When the electric power supplied from the AC adapter 11a is smaller than the electric power consumed by the load circuit 20, the insufficient amount of the electric power is supplied from the PD adapter 12a. When the electric power for the load circuit 20 is insufficient even if the PD adapter 12a supplies the electric power, the insufficient amount of the electric power is supplied from the battery 13.

As described above, according to the magnitude relation among the electric power supplied from the AC adapter 11a, the electric power supplied from the PD adapter 12a, the electric power supplied from the battery 13, and the electric power consumption of the load circuit 20, the electric power source for supplying electric power to the load circuit 20 and the amount of the electric power supplied from each power source are determined.

Figure 2:
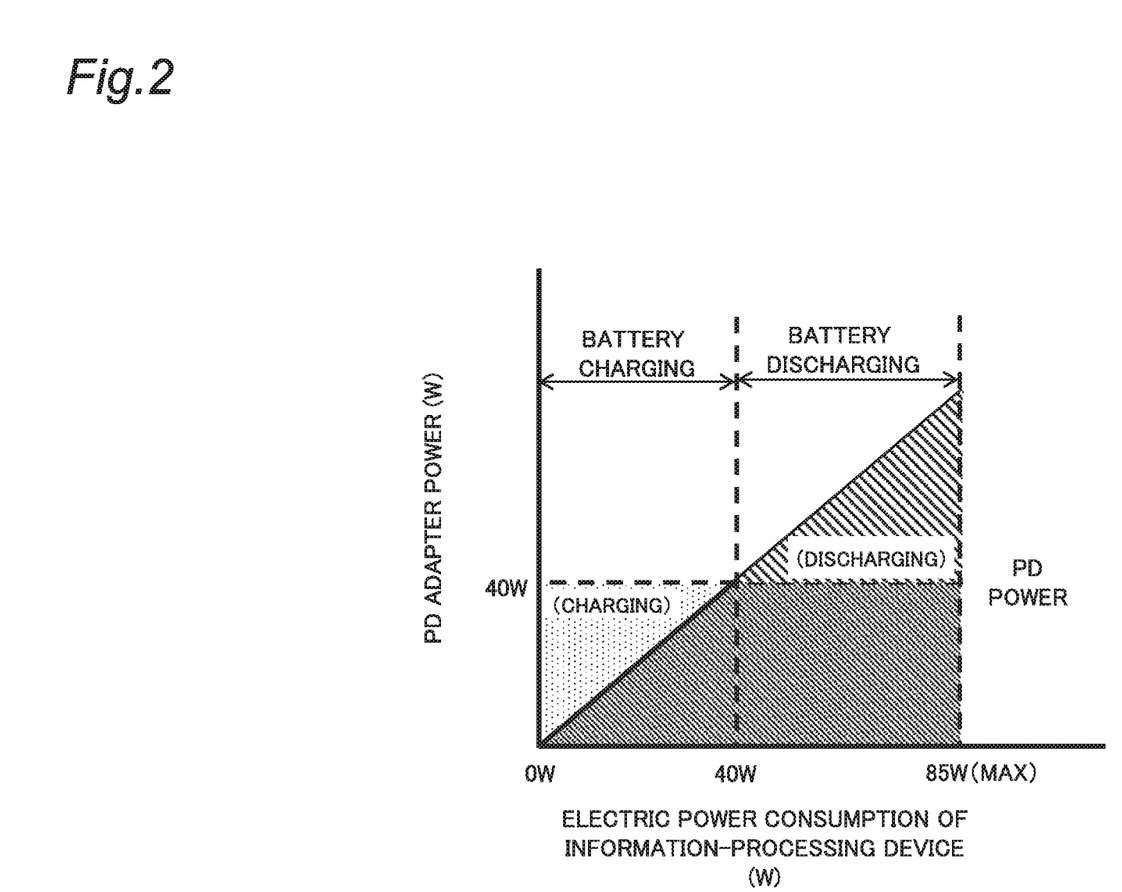
FIG. 2 is a diagram showing a relationship among power supplied from a PD adapter, electric power consumption, and charging/discharging of a battery.

FIG. 2 is a diagram for explaining a relation between supply electric power from the PD adapter 12a, electric power consumption of the load circuit 20, and charge/discharge of the battery 13 when a PD adapter 12a is connected to the information-processing device 10.

In the example of FIG. 2, the maximum electric power consumption of the information-processing device 10 is set to 85 W, and the supply electric power of the PD adapter 12a is set to 40 W. When electric power of 40 W is supplied from the PD adapter 12a, when the electric power consumption of the load circuit 20 is less than 40 W, the battery 13 is charged by the remaining electric power obtained by subtracting the electric power consumption from the supplied electric power. On the other hand, when the electric power consumption of the load circuit 20 exceeds 40 W, the electric power to the load circuit 20 is insufficient only by the electric power supplied from the PD adapter 12a. At this time, the insufficient amount of the electric power is supplied from the battery 13 to the load circuit 20. That is, the battery 13 discharges. When the electric power consumption of the load circuit 20 exceeds the electric power supplied from the PD adapter 12a, the charging circuit 17 is turned on, and even if the charging operation is performed, the battery 13 is not charged and electric power is supplied (discharged) from the battery 13 to the load circuit 20.

Thus, when the electric power consumption is within the range of the power supply capability of the PD adapter 12a, the battery 13 is charged by the electric power supplied from the PD adapter 12a. However, when the electric power consumption exceeds the power supply capability of the PD adapter 12a, electric power is supplied from both the PD adapter 12a and the battery 13 to the load circuit 20. That is, when the PD adapter 12a is connected to the information-processing device 10, the battery 13 is charged or discharged according to the electric power consumption.

In this case, when the electric power consumption fluctuates near the maximum supply power of the PD adapter 12a, charging/discharging is repeated with respect to the battery 13. In particular, when such charging and discharging is repeated when the battery 13 is in a state close to a full charge state, a problem that deterioration of the battery 13 is incurred occurs. In general, a commercially available PD adapter has a variety of power supply capabilities. Therefore, when the power supply capability of the PD adapter is significantly smaller than the maximum electric power consumption of the information-processing device 10, the above problem is more remarkably generated.

An information-processing device 10 of the present embodiment has a function of reducing repetition of charging and discharging of the battery 13 and suppressing deterioration of the battery 13.

Figure 3:
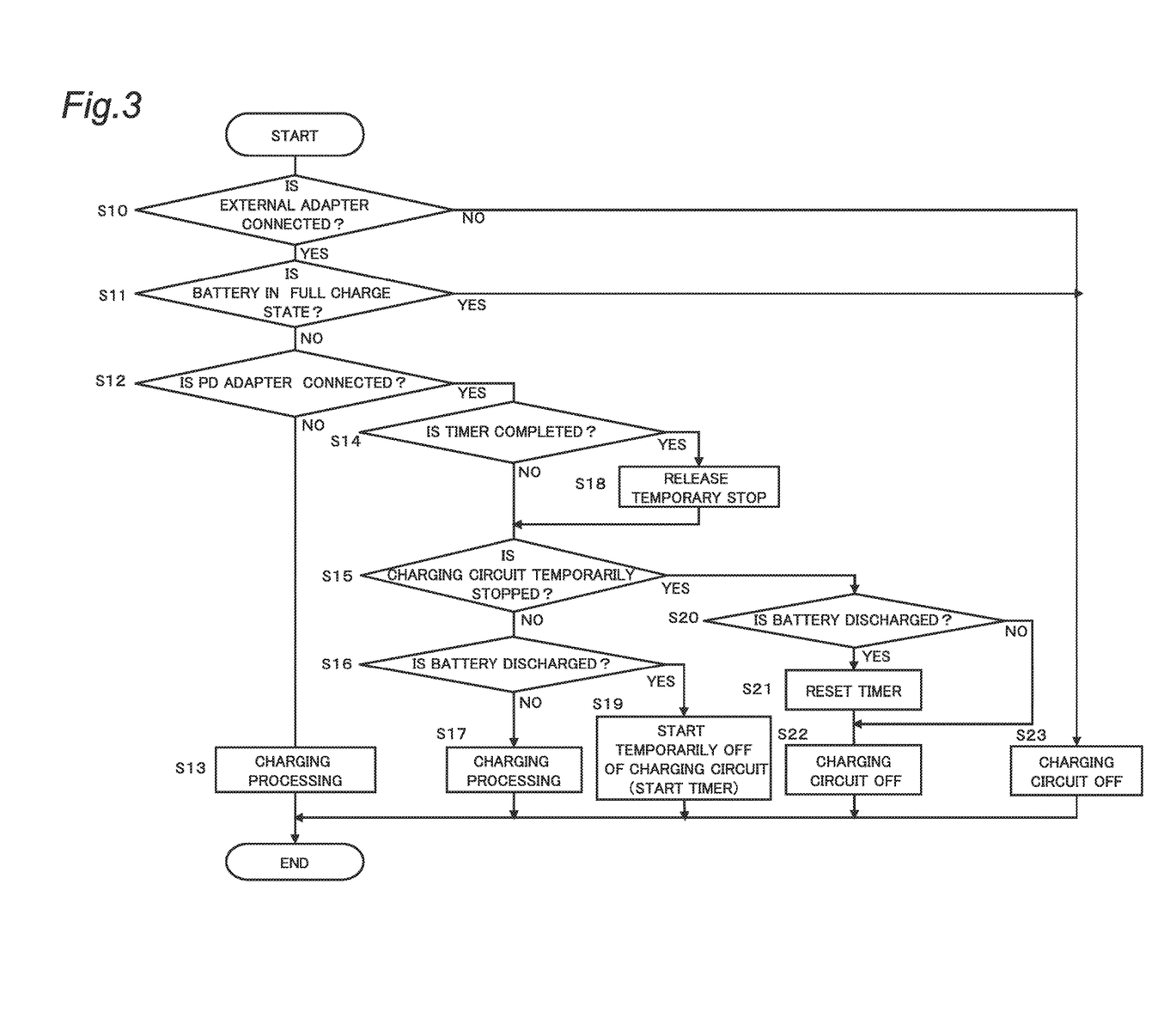
FIG. 3 is a flowchart relating to charging control of a battery at the time when a PD adapter is connected.

FIG. 3 is a flowchart relating to charging control of the battery 13 when the PD adapter 12a is connected. The power control at the time of connection of the PD adapter 12a in the information-processing device 10 is described below with reference to FIG. 3. The processing shown in FIG. 3 is repeatedly executed at a predetermined cycle (for example, one second) by the power controller 19.

The power controller 19 determines whether an external adapter (that is, at least one of the AC adapter 11a and the PD adapter 12a) is connected to the information-processing device 10 (S10). When none of the AC adapter 11a and the PD adapter 12a is not connected to the information-processing device 10 (NO in S10), the battery 13 cannot be charged, so that the power controller 19 turns off (stops) the charging circuit 17 (S23). When the charging circuit 17 is turned off, the charging operation to the battery 13 is not performed.

When at least one of the AC adapter 11a and the PD adapter 12a is connected to an information-processing device 10 (YES in S10), the power controller 19 determines whether the battery 13 is in the "full charge state" (S11). In the present embodiment, the power controller 19 sets a first flag indicating the full charge state, and can determine by referring to the first flag.

When the battery 13 is in the "full charge state" (YES in S11), the battery 13 does not need to be further charged, so that the power controller 19 turns off the charging circuit 17 (S23).

When the battery 13 is not in the "full charge state" (NO in S11), the power controller 19 determines whether the PD adapter 12a is connected to the information-processing device 10 (S12). When the PD adapter 12a is not connected to the information-processing device 10 (NO in S12), the power controller 19 performs charging processing to the battery 13 (S13). Details of the charging process will be described later.

On the other hand, when the PD adapter 12a is connected to the information-processing device 10 (YES in S12), the power controller 19 determines whether or not the timer is completed (S14). Here, the timer measures the stop period when the charging circuit 17 is temporarily stopped. When the timer is completed (YES in S14), that is, when the timer measures a predetermined period (for example, 30 seconds), the power controller 19 releases the temporary stop of the charging circuit 17 (S18). specifically, the power controller 19 sets a second flag indicating the state of the charging circuit 17 to a value indicating that the charging circuit 17 is not temporarily stopped.

Thereafter, the power controller 19 refers to the second flag to determine whether the charging circuit 17 is temporarily stopped (S15). When the charging circuit 17 is not temporarily stopped (NO in S15), the power controller 19 determines whether or not the battery 13 is discharged (S16). The voltage and current measuring unit 18 measures a current flowing into the battery 13. When the current measured by the voltage and current measuring unit 18 is negative, the power controller 19 determines that the battery 13 is in a discharging state, and when the current is positive, the power controller 19 determines that the battery 13 is in a charging state. The case where the battery 13 is in a discharging state means that the power from the battery 13 is also supplied to the load circuit 20 due to a fact that sufficient electric power is not supplied from the PD adapter 12a to the load circuit 20.

When the battery 13 is not discharged (NO in S16), that is, when sufficient electric power is supplied from the PD adapter 12a to the load circuit 20, the power controller 19 performs charging processing to the battery 13 with the electric power of surplus electric power out of the electric power supplied from the PD adapter 12a (S17).

When the battery 13 is discharged (YES in S16), that is, when electric power is supplied from the battery 13 to the load circuit 20, the power controller 19 temporarily stops the charging circuit 17 (S19). For example, the charging circuit 17 is stopped (turned off) for 30 seconds. At this time, the power controller 19 starts a timer for measuring a period during which the charging circuit 17 is stopped.

The condition where the battery 13 is discharged (YES in S16) regardless of whether the charging circuit 17 is on and in charging operation (NO in S15) is a condition where the electric power consumption of the load circuit 20 exceeds the electric power supplied from the PD adapter 12a, the electric power is insufficient only by the electric power from the PD adapter 12a, and the battery 13 supplies the insufficient amount of the electric power. Since the output of the PD adapter input unit 12 and the battery 13 are connected in parallel, even when the charging circuit 17 is controlled to turn on and perform the charging operation, if the electric power supplied from the PD adaptor 12a to the load circuit 20 is insufficient, the insufficient amount of the electric power is supplied from the battery 13.

Even when the charging circuit 17 is controlled to perform charging operation, when the discharge from the battery 13 is confirmed, the charging operation is temporarily stopped (e.g., 30 seconds). Thereby, when the electric power consumption of the load fluctuates near the suppliable power value of the PD adapter 12a, repetition of charging/discharging can be reduced, and deterioration of the battery 13 can be suppressed.

On the other hand, when the charging circuit 17 is temporarily stopped (YES in S15), the power controller 19 determines whether or not the battery 13 is discharged (S20). When the battery 13 is discharged (YES in S20), the power controller 19 resets the timer (S21). Then, the power controller 19 continues stopping of the charging circuit 17 (S22).

While the discharge of the battery 13 is continuously detected, the timer is reset to measure the elapsed time from the end of the discharge operation of the battery 13. By referring to the value of the timer obtained in this way, the charging of the battery 13 can be temporarily stopped until a predetermined time elapses after the discharge operation is stopped after the discharge operation of the battery 13 is detected.

Figure 4:
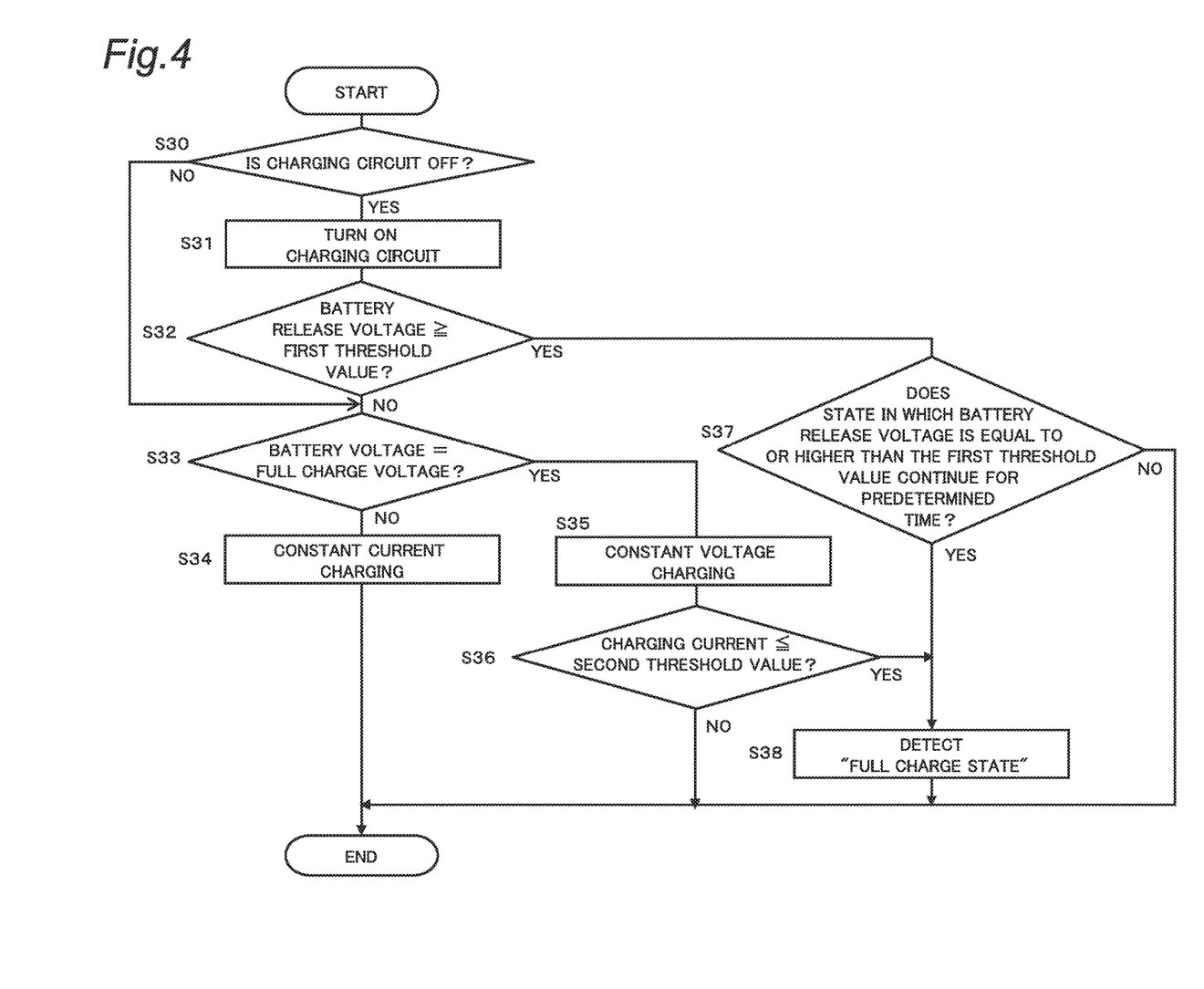
FIG. 4 is a flowchart of a charging processing routine.

FIG. 4 is a flowchart showing details of charging processing (steps S13, S16) in the flowchart of FIG. 3. With reference to FIG. 4, details of processing in charging processing (steps S13 and S16) are described.

The power controller 19 determines whether or not the charging circuit 17 is off based on the second flag (S30). When the charging circuit 17 is off (YES in S30), the power controller 19 turns on the charging circuit 17 to start the charging operation (S31).

When the charging circuit 17 is turned on from off, the power controller 19 determines whether a battery release voltage of the battery 13 is equal to or more than a first threshold value based on an output from the voltage and current measuring unit 18 (S32). The battery release voltage is the voltage of the battery 13 when neither charging nor discharging is performed. The first threshold value is a value of the battery release voltage when the battery 13 is in the full charge state.

When the battery release voltage is less than the first threshold value (NO in S32), the power controller 19 determines whether the voltage of the battery 13 is a full charge voltage (S33). The full charge voltage is the lower limit value of the voltage of the battery 13 when it is determined that the battery 13 is in the full charge state.

Figure 5:
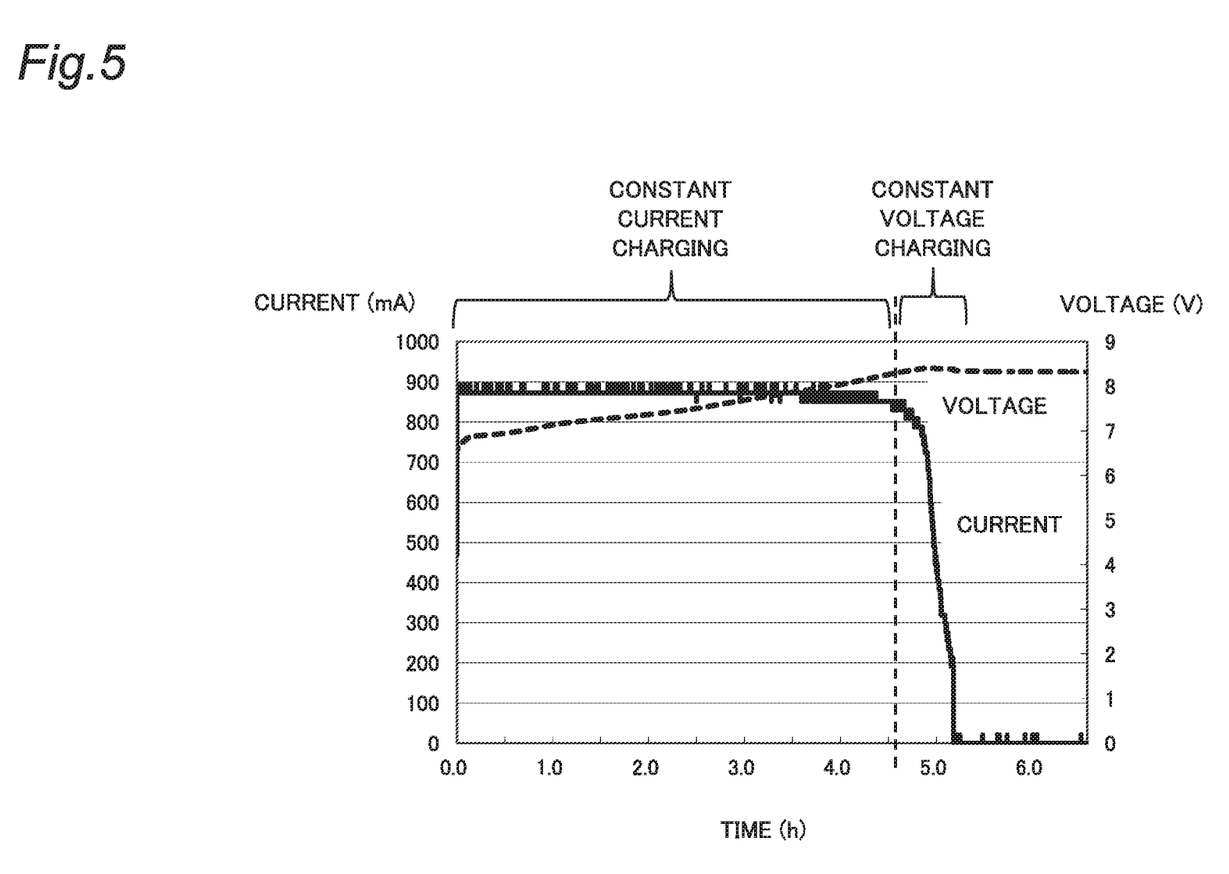
FIG. 5 is a diagram for describing constant current charging and constant voltage charging of a battery.

When the voltage of the battery 13 is not the full charge voltage (NO in S33), the power controller 19 performs constant current charging (refer to FIG. 5) for charging the battery 13 with a constant charging current (S34).

When the voltage of the battery 13 is the full charge voltage (YES in S33), the power controller 19 performs constant voltage charging for charging the battery 13 with a constant charging voltage (S35). In the constant voltage charging, the charging current is decreased as the charging state of the battery 13 proceeds (refer to FIG. 5). When the charging current becomes equal to or less than a predetermined threshold value, it is determined that the battery 13 is in the full charge state. The predetermined threshold value is referred to as a "second threshold value". That is, the second threshold value is a value of the charging current of the battery 13 when it is determined that the battery 13 is in the full charge state.

When the charging current becomes equal to or less than the second threshold value in the constant voltage charging (YES in S36), it is detected that the battery 13 is in the "full charge state" (S36). At this time, the first flag is set to a value indicating the "full charge state".

Returning to step S32, when the battery release voltage is equal to or higher than the first threshold value (YES in S32), the power controller 19 determines whether a state in which the battery release voltage is equal to or higher than the first threshold value continues for a predetermined time (for example, 3 seconds) (S37). when a state in which the battery release voltage is equal to or higher than the first threshold value continues for a predetermined time (for example, 3 seconds) (YES in S37), the power controller 19 detects that the battery 13 is in the "full charge state" (S38).

When the state in which the battery release voltage is equal to or higher than the first threshold value is not continued for the predetermined time (NO in S37), the power controller 19 terminates the present processing.

Figure 6:
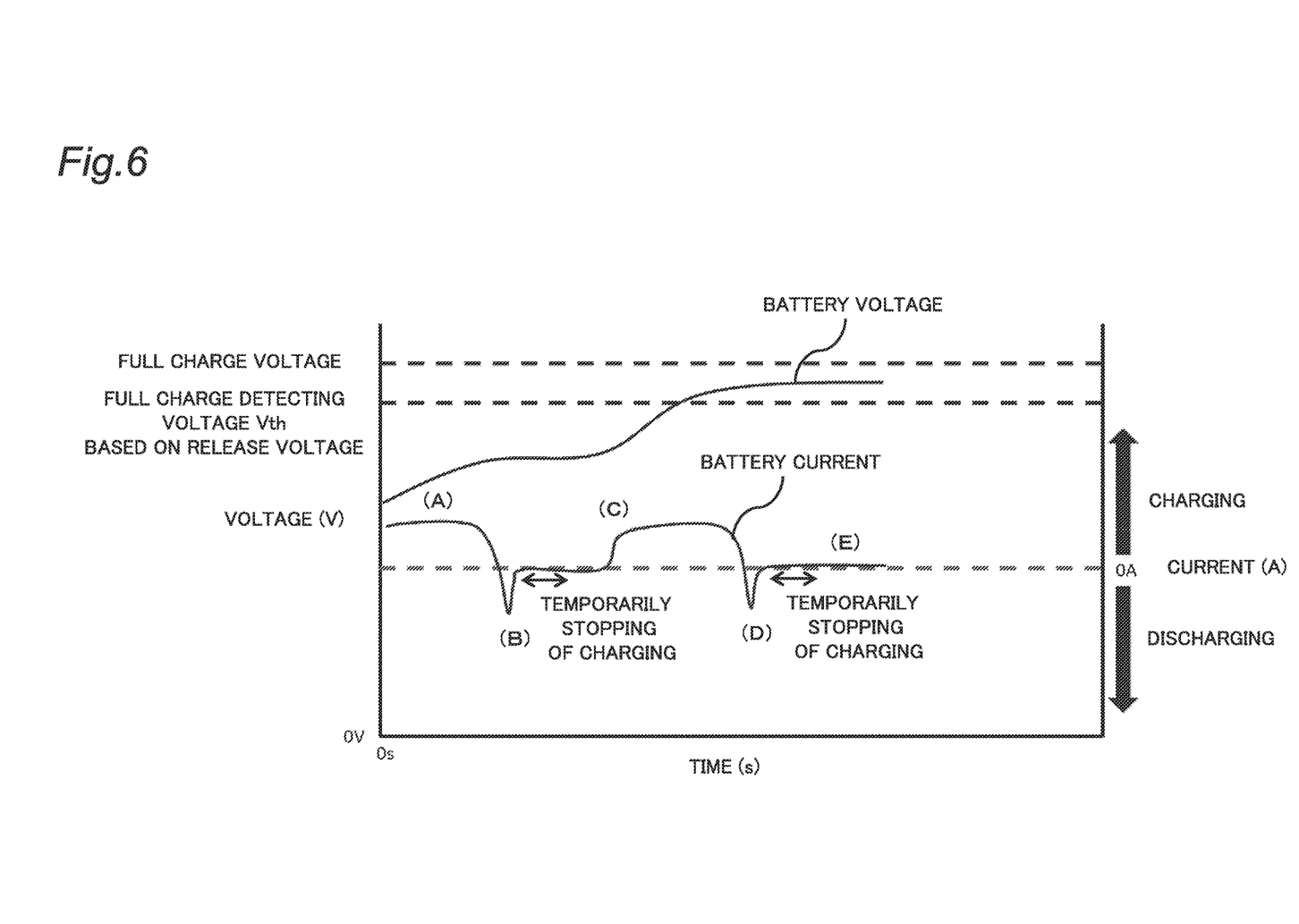
FIG. 6 is a diagram showing an example of a change of a charging voltage and a charging current of a battery when a PD adaptor is connected to an information-processing device.

FIG. 6 is a diagram showing an example of a change of a charging voltage and a charging current of the battery 13 when the power control as described above is performed when only the PD adaptor 12a is connected to the information-processing device 10.

When the electric power consumption of the load circuit 20 is smaller than the electric power from the PD adapter 12a, the battery 13 is charged by the remaining electric power excluding the electric power consumption from the electric power from the PD adapter 12a. Thus, the voltage of the battery 13 rises (refer to the state (A) of FIG. 6). Thereafter, when the electric power consumption of the load circuit 20 increases and becomes larger than the electric power from the PD adapter 12a, the electric power from the battery 13 is supplied in addition to the electric power from the PD adapter 12a to the load circuit 20. That is, the battery 13 discharges (refer to the state (B) of FIG. 6) at this time, the power controller 19 stops charging of the battery 13 for a fixed time (S19). Thereafter, when the electric power consumption in the load circuit 20 decreases, the discharge from the battery 13 stops. When the fixed time passes, charging of the battery 13 is started (refer to state (C) in FIG. 6), and the voltage and current of the battery 13 increase. Thereafter, when the electric power consumption of the load circuit 20 increases, discharge from the battery 13 occurs (refer to state (D) in FIG. 6). When the discharge from the battery 13 is detected, charging of the battery 13 is stopped for the fixed time (S19) when the battery is not discharged (NO in S16) and the state in which the release voltage of the battery 13 exceeds the first threshold value (Vth) continues for the predetermined time or longer (YES in S37), it is determined that the battery 13 is in the full charge state (YES in S38 and S11), and the charging of the battery 13 is stopped (S23) (refer to the state (E) of FIG. 6).

[1-3. Effect, Etc.]

As described above, the information-processing device 10 (one example of an electronic apparatus) according to the present embodiment) includes: the PD adapter input unit 12 (an example of an external electric power input terminal) for inputting electric power from an external device; the PD adapter detector 16 (an example of a detector) for detecting that the PD adapter 12a (an example of an external device) is connected to an external electric power input terminal; the battery 13 that is chargeable; the voltage and current measuring unit 18 (an example of a measuring unit) for measuring voltage and current; the load circuit 20 for consuming electric power; the charging circuit 17 for charging the battery 13; and the power controller 19 for controlling on/off of the charging circuit 17.

The power controller 19 sets the charging circuit to off for a predetermined period (S19), when the PD adaptor detector 16 detects that the PD adaptor 12a is connected to the PD adapter input unit 12 (YES in S12), the charging circuit 17 is set to on (NO in S15), and the discharging operation of the battery 13 is detected based on the measurement result of the voltage and current measuring unit 18 (YES in S16).

When the discharge operation of the battery 13 is detected during the charging operation of the battery 13, the charging circuit 17 is turned off for a fixed period, so that the repetition of charging and discharging to the battery 13 can be reduced, and deterioration of the battery 13 can be suppressed.

Other Embodiment

As described above, an exemplary embodiment 1 is described as an example of the technique disclosed in the present application. However, the technique of the present disclosure is not limited to this, and can be applied to an embodiment in which a change, replacement, addition, omission, or the like is performed as appropriate. Further, the components described in the first embodiment may be combined to form a new embodiment.

In the above embodiment, as an example of an external apparatus for supplying electric power to an information-processing device 10, a PD adaptor 12a for converting commercial AC power into DC power has been described, but the external apparatus is not limited to this. The external device may be any device (for example, a personal computer) as long as it is capable of supplying electric power to the information-processing device 10.

In the above-described embodiment, the processing in steps S14 to S22 of FIG. 3 is not limited to an external device (PD adaptor 12a) for supplying electric power according to a predetermined bus standard, and can be applied to any device supplying electric power. In particular, the above processing is effective in suppressing battery deterioration when a device of which power supply capability is smaller than the electric power consumption of the information-processing device.

In the above embodiment, an information-processing device is described as an example of an electronic apparatus. However, the electronic apparatus is not limited to this. An electronic apparatus to which the present disclosure is directed may be any device that incorporates a chargeable battery and can receive supply of electric power from an external device.

As described above, an embodiment of the technique according to the present disclosure is described. Accordingly, the accompanying drawings and the detailed description are provided.

Accordingly, among the components described in the accompanying drawings and the detailed description, not only components essential for solving the problem, but also components that are not essential for solving the problem may be included in order to illustrate the above-described technique. Therefore, it should not be construed that the non-essential components are required to be essential, with the components not essential to them being described in the accompanying drawings and the detailed description.

Furthermore, since the above-described embodiment is intended to illustrate the technique of the present disclosure, various changes, substitutions, additions, omissions, and the like can be made within the scope of the claims or the equivalents thereof.

INDUSTRIAL APPLICABILITY

The present disclosure is capable of reducing repetition of charging and discharging to a battery and suppressing deterioration of a battery. Thus, the present disclosure is useful for electronic apparatus capable of charging a battery by electric power supplied from an external device.

What is claimed is:

1. An electronic apparatus comprising:
   an external electric power input terminal that receives electric power from an external device,
   a detector that detects that the external device is connected to the external electric power input terminal,
   a battery that is chargeable,
   a measuring unit that measures voltage and current of the battery,
   a load circuit that consumes the electric power,
   a charging circuit that charges the battery, and
   a power controller that sets the charging circuit to on or off, wherein
   the power controller sets the charging circuit to off during a predetermined period, when a discharge operation of the battery is detected based on a measuring result of the measuring unit in a state in which the charging circuit is set to on, when the detector detects that the external device is connected to the external electric power input terminal.

2. The electronic apparatus according to claim 1, wherein the power controller sets the charging circuit to off when it is detected that a state in which release voltage of the battery is equal to or more than a predetermined value continues for a predetermined time or more based on the measurement result by the measuring unit.

3. The electronic apparatus according to claim 1, wherein the external electric power input terminal and the battery are connected in parallel.

4. The electronic apparatus according to claim 1, wherein the predetermined period is a period from the time when the discharge operation of the battery is detected to the time when a fixed period elapses after the stop of the discharge operation of the battery is detected.

5. The electronic apparatus according to claim 1, wherein the external device is a device that supplies electric power according to a predetermined serial bus standard.

6. The electronic apparatus according to claim 5, wherein the predetermined serial bus standard is a USB Power delivery standard.

* * * * *